US007801500B2

(12) United States Patent
Kraft et al.

(10) Patent No.: US 7,801,500 B2
(45) Date of Patent: Sep. 21, 2010

(54) ELECTRONIC DEVICE AND METHOD THEREFOR

(75) Inventors: Christian Kraft, Frederiksberg (DK); Peter Dam Nielsen, Lyngby (DK); Michael Kristiansen, Borup (DK)

(73) Assignee: Nokia Corporation, Espoo (FI)

( * ) Notice: Subject to any disclaimer, the term of this patent is extended or adjusted under 35 U.S.C. 154(b) by 1108 days.

(21) Appl. No.: 11/402,221

(22) Filed: Apr. 11, 2006

(65) Prior Publication Data

US 2007/0238427 A1 Oct. 11, 2007

(51) Int. Cl.
*H04B 1/18* (2006.01)

(52) U.S. Cl. .................... 455/160.1; 455/125; 455/185; 455/550.1; 725/26

(58) Field of Classification Search ................. 455/120, 455/125, 150.1, 160.1, 179.1, 185, 550.1; 725/26
See application file for complete search history.

(56) References Cited

U.S. PATENT DOCUMENTS

2003/0125033 A1* 7/2003 Rindsberg et al. ........... 455/450
2005/0020223 A1 1/2005 Ellis et al.
2008/0077959 A1* 3/2008 Kirimura et al. .............. 725/46

* cited by examiner

*Primary Examiner*—Nhan Le

(57) ABSTRACT

An electronic device includes a radio tuner capable of receiving broadcast media contents and information about each of the broadcast media contents from a plurality of radio stations; a user communication interface configured for receiving from a user a list of desired broadcast media contents; a memory; and a processor. According to the invention the processor is responsible for accessing the list of desired broadcast media contents stored in the memory; the radio tuner is controlled to detect the radio stations to retrieve information of the broadcast media contents that are currently being, or are in the near future to be, broadcast from the radio stations; the retrieved information is compared with the list of desired broadcast media contents; and the user is alerted via the user communication interface if the comparison reveals that a broadcast media content that is currently being, or are in the near future to be, broadcast is comprised in the list of desired broadcast media contents.

24 Claims, 9 Drawing Sheets

*Fig. 3b*
*Fig. 4b*
Radio Alert
Anastacia
Now
playing
on 100FM
Listen
Exit
Radio recording
Anastacia
"Paid my dues"
recorded from
100FM
Listen
Save
Discard

ELECTRONIC DEVICE AND METHOD THEREFOR

TECHNICAL FIELD

The disclosed embodiments relate to an electronic device comprising a radio tuner capable of receiving broadcast media contents and information about each of the broadcast media contents from a plurality of radio stations, and to a method therein.

DESCRIPTION OF RELATED ART AND BACKGROUND

Radio data systems such as the RDS system in Europe and the radio broadcast data system (RBDS) in the United States transmit auxiliary information within the radio broadcast to achieve various automatic functions of the receiver and to increase the utility of the receiver to a listener. The auxiliary information typically includes a traffic capable flag to identify broadcast stations which carry traffic announcements and a traffic announcement flag for identifying that a traffic announcement is currently being transmitted by the broadcast station. Other RDS flags are transmitted to identify emergency alert messages, news broadcasts, and weather announcements, for example. These flags allow a radio receiver to be automatically tuned to a broadcast station that provides traffic information for a driver of an automobile. In addition, a radio receiver can monitor a traffic capable station during times that the audio system is reproducing audio signals from a source other than a traffic capable radio station in order to automatically retune to the traffic announcement when one is present.

Another type of auxiliary information typically broadcasted includes a program type code or a program identification code that identifies a content type by which a broadcast station is operating (e.g., classical, rock, jazz, news, or even specific network programming). The program type code allows a listener to seek or tune the radio receiver to a broadcast station of a particular program format.

Further, the RDS system offers a number of information regarding music tracks that are broadcast. Such information may comprise a title of the music track, a name of the artist or artist group on the music track, etc. Such functionality opens up for a broad spectrum of applications, which may facilitate for the user of a radio tuner, or provide a more flexible use thereof.

SUMMARY

The disclosed embodiments provide an electronic device comprising a radio tuner capable of receiving broadcast media contents and information about each of the broadcast media contents from a plurality of radio stations, which provides for interactive radio listening.

It is in this respect, an aspect of the invention is to provide such a device, by which a user can be automatically updated of when his/her favorite music tracks and/or his/her favorite artists or artist groups are being, or are in the near future to be, broadcast from a radio station.

Another aspect of the invention provides a device, by which the user may more proactively listen to his/her favorite music only.

A further aspect of the invention provides a device, which further comprises a music player, by which device the user may swap back and forth from radio listening to local music playing depending on the user's favorite preferences.

Still a further aspect of the invention provides a device, which is flexible, fast, effective, user-friendly, and easy to implement.

Still a further aspect of the invention provides a device, which provides for automatic detection of radio stations and for automatic recording of broadcast media contents.

Yet a further aspect of the invention provides a device, by which favorite broadcast media contents, e.g. music tracks, are easier found and received.

Still a further aspect of the invention provides a device, which provides for intelligent swapping between radio reception and local music playing.

Yet a further aspect of the invention provides a device, by which undesired broadcast media contents, e.g. music tracks, are easier avoided.

According to a first aspect of the invention there is provided an electronic device and a method for alerting a user of the device. A list of desired broadcast media contents, preferably music tracks, is stored in a memory of the device, the radio tuner is controlled to detect the radio stations to retrieve information of the broadcast media contents that are, or are in the near future to be, broadcast from the radio stations, the retrieved information is compared with the list of desired broadcast media contents, and the user is alerted via a user communication interface of the device if the comparison reveals that a broadcast media content that is being, or is in the near future to be, broadcast is comprised in the list of desired broadcast media contents.

Hence, an entirely novel method for music listening is provided. No time consuming manual radio station detection is needed in order to find a radio station of interest to the user.

According to a second aspect of the invention there is provided an electronic device and a method for recording a broadcast media content, preferably a music track or part thereof, in the device. A list of desired broadcast media contents is stored in a memory of the device, the radio tuner detects the radio stations to retrieve information of the broadcast media contents that are, or are in the near future to be, broadcast from the radio stations, the retrieved information is compared with the list of desired broadcast media contents, and if the comparison reveals that a broadcast media content that is being, or is in the near future to be, broadcast is comprised in the list of desired broadcast media contents, at least part of the broadcast media content is automatically recorded in the memory.

Hence, automatic detection and recording tracks of the user's favorite artists and tracks when being broadcast on the radio is enabled.

According to a third aspect of the invention there is provided an electronic device and a method for displaying a list of radio stations in the device. A list of desired broadcast media contents is stored in a memory of the device, the radio tuner is controlled to detect the radio stations to retrieve information of the broadcast media contents that are, or are in the near future to be, broadcast from the radio stations, the retrieved information is compared with the list of desired broadcast media contents, and a list of radio stations is displayed wherein the list of radio stations is automatically determined based on the list of desired broadcast media contents stored in the memory and on the information of the broadcast media contents that are, or are in the near future to be, broadcast from the radio stations.

Hence, a much easier manner of selecting the user's favorite artists and tracks when tracks of these are, or are in the near future to be, broadcast on the radio is enabled.

According to a fourth aspect of the invention there is provided an electronic device and a method for alerting a user of the device. If a music track is received by the radio tuner, the name of the artist or artist group on the music track received by the radio tuner is retrieved, the name of the artist or artist group is compared with names of artists or artist groups of music tracks stored in a memory of the device, and the user is alerted via a user communication interface of the device if the comparison reveals that the name of the artist or artist group on the music track received by the radio tuner is comprised among the names of the artists or artist groups of music tracks stored in the memory.

According to a fifth aspect of the invention there is provided an electronic device and a method for alerting a user of the device, wherein the device comprises a music player. If a music track is played back on the music player, the name of the artist or artist group on the music track played back on the music player is retrieved, the radio tuner is controlled to detect the radio stations to retrieve artist name information of music tracks that are, or are in the near future to be, broadcast from the radio stations, the name of the artist or artist group is compared with artist name information of music tracks that are, or are in the near future to be, broadcast from the radio stations, and the user is alerted via a user communication interface of the device if the comparison reveals that the name of the artist or artist group on the music track played back on the music player is comprised in the artist name information of music tracks that are, or are in the near future to be, broadcast from the radio stations.

Hence, much easier manners of swapping between radio and a music player in order to listen to tracks of the user's favorite artists are enabled. The swapping functionality enables the user to get inspired to listen to music tracks stored in the memory of the device when listening to a related track on the radio, and vice versa.

According to a sixth aspect of the invention there is provided an electronic device and a method for alerting a user of the device. If a music track is received by the radio tuner, the name of the artist or artist group on the music track, the title of the music track, or the genre to which the music track belongs is retrieved, and the name of the artist or artist group is compared with a blacklist of artists or artist groups stored in a memory of the device, the title of the music track is compared with a blacklist of music track titles stored in the memory, or the genre to which the music track belongs is compared with a blacklist of genres stored in the memory. The user is alerted via a user communication interface of the device or the radio tuner is automatically tuned to another radio station if the comparison reveals that the name of the artist or artist group on the music track is comprised in the blacklist of artists or artist groups, that the title of the music track is comprised in the blacklist of music track titles, or that the genre to which the music track belongs is comprised in the blacklist of genres.

Hence, a simple yet efficient manner for the user to avoid undesired music is provided.

Further characteristics of the invention and advantages thereof will be evident from the following detailed description of embodiments of the invention and the accompanying FIGS. 1-8, which are given by way of illustration only, and thus are not limitative of the aspects of the invention.

DETAILED DESCRIPTION OF EMBODIMENTS

Figure 1:
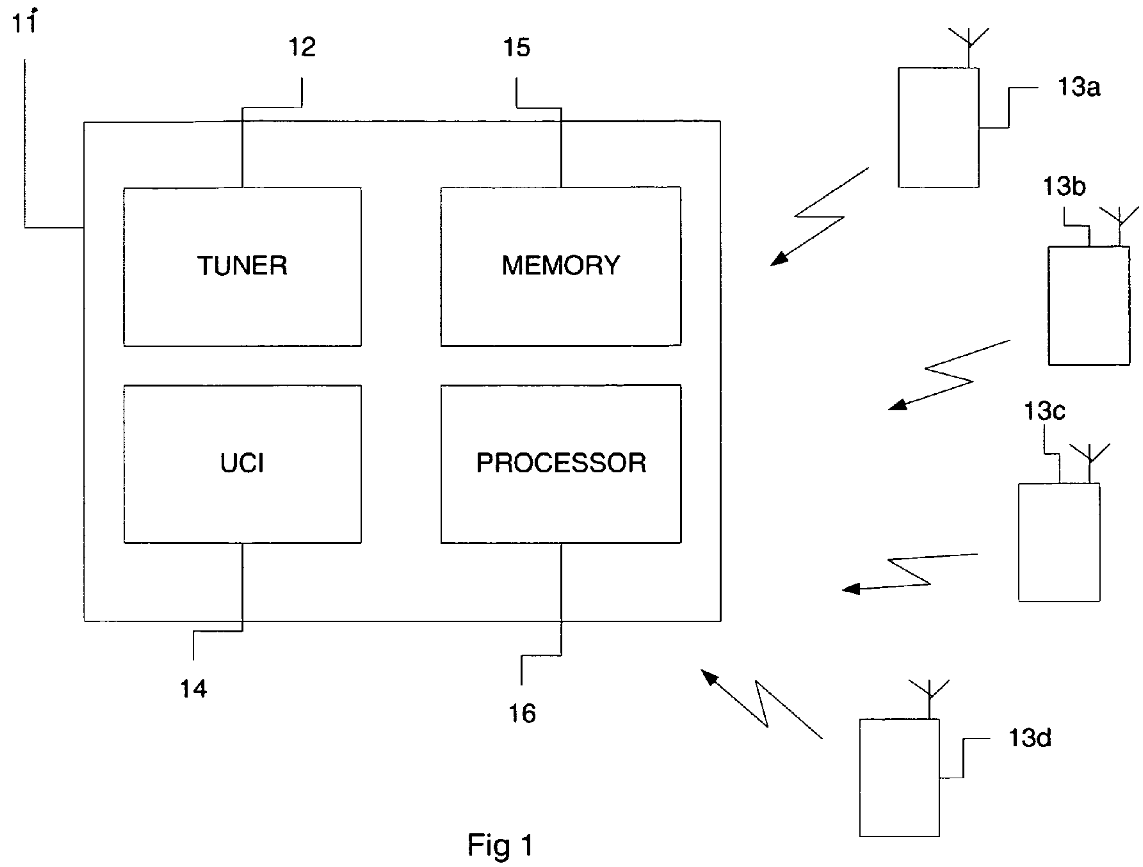
FIG. 1 illustrates, schematically, a block diagram of a system comprising a plurality of radio stations and a broadcast media contents receiving device according to an embodiment of the invention.

In FIG. 1 an electronic device 11 according to an embodiment of the invention comprises a radio tuner 12 capable of receiving broadcast media contents and information about each of the broadcast media contents from a plurality of radio stations 13*a*-*d*. Preferably, the radio tuner is an RDS or RBDS radio tuner.

The device 11 comprises further a user communication interface 14, memory 15, and a processor 16. The communication interface comprises preferably a keypad or similar and a display unit or screen.

Figure 2:
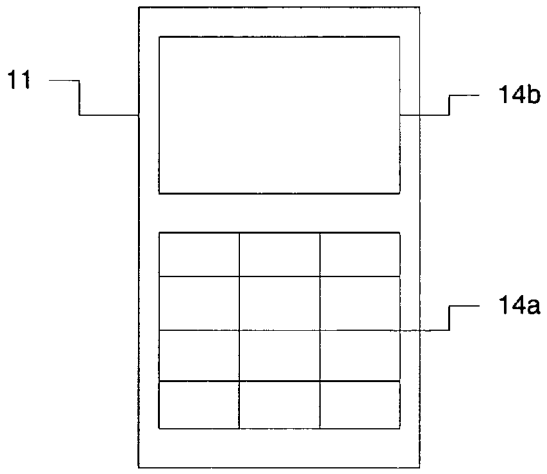
FIG. 2 illustrates, schematically, an exemplary embodiment of the broadcast media contents receiving device of FIG. 1.

In one embodiment, as being illustrated in FIG. 2, the device 11 is a hand-portable telephone, such as a mobile phone, provided with an RDS radio. Such a device may typically comprise a keypad 14*a* and a joystick or similar for input of commands from the user of the device. Optionally, the phone is provided for receiving voice commands or has a touch sensitive screen. Further, a display unit 14*b*, a loudspeaker and/or a headphone, and optionally vibration means may be provided for outputting information and alerts to the user. The hand-portable telephone may further comprise a music player, such as an mp3 player.

The device 11 of the present invention is provided to offer entirely new methods for interactive music listening and recording. The methods, which will be described in the following, are preferably carried out by means of software loadable into the memory 15 of the device 11 and run by the processor 16. The software may be provided on a storage medium such as a DVD, or it may be downloadable from the Internet, e.g. from the Nokia website.

Figure 3A:
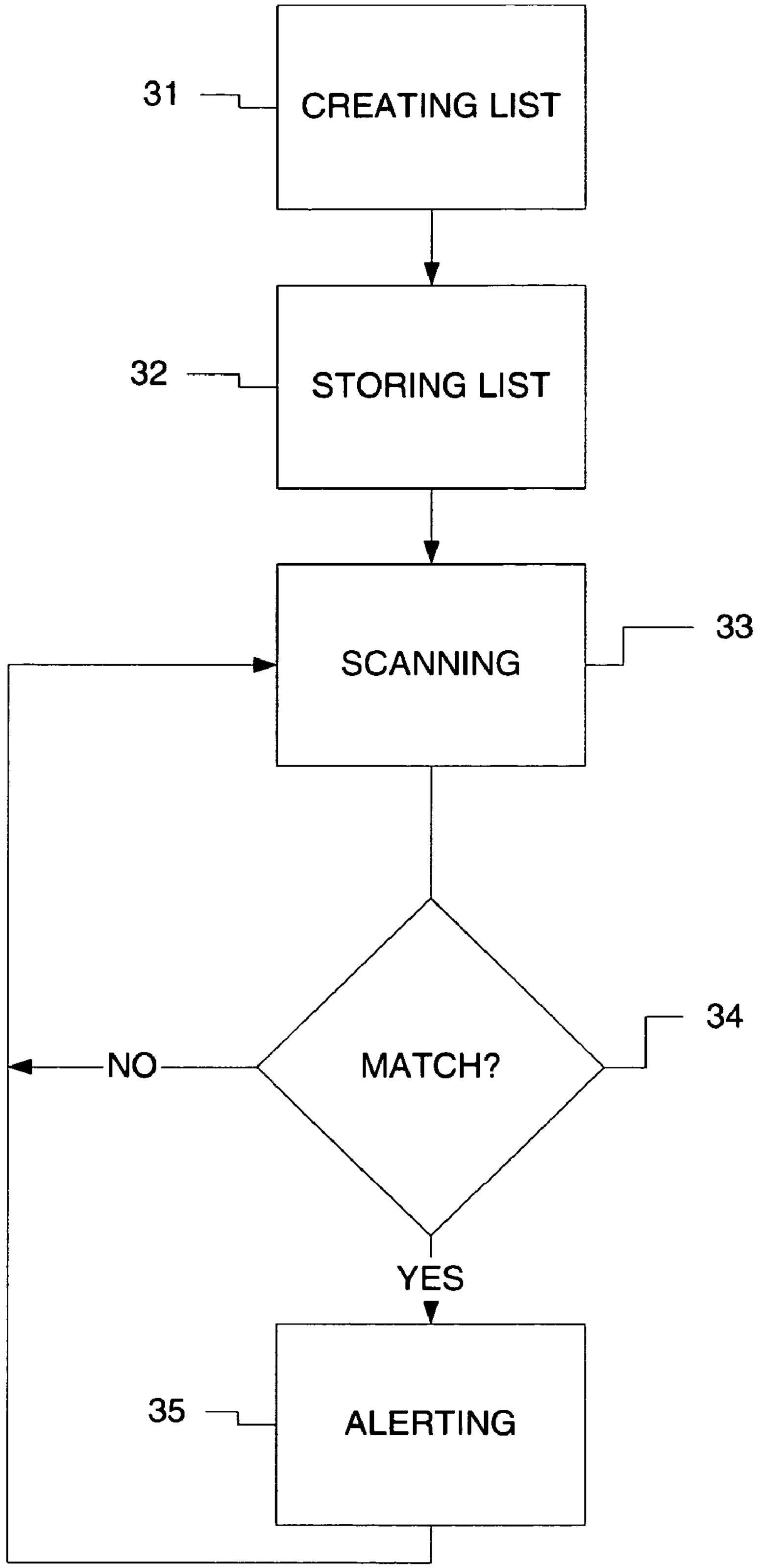
FIGS. 3*a*, 4*a*, 5*a*, 6*a*, 7*a*, and 8*a* are each a flow chart of a method as performed by the broadcast media contents receiving device of FIG. 1 according to a respective embodiment of the present invention.

Thus, a method as performed by the broadcast media contents receiving device of FIG. 1 according to a first embodiment of the invention will be described with reference to the flow chart of FIG. 3*a*. The method is referred to as a method for alerting a user when favorite broadcast media contents, preferably favorite music, are, or are in the near future to be, broadcast from a radio station.

A list of desired broadcast media contents, is in a step 31, created. The list may be received from the user via the user communication interface 14. Alternatively, the list is automatically created by the processor 16 based on data stored in the memory 15, or in any other manner. The list of desired broadcast media contents is, in a step 32, accessed 31 from the memory 15.

Next, the radio tuner 12 is, in a step 33, controlled to detect the radio stations to retrieve information of the broadcast media contents that are, or are in the near future to be, broadcast from the radio stations. The radio stations to be detected may be all radio stations that are being capable of being received by the radio tuner 12. Alternatively, the radio stations to be detected are those of a list of desired radio stations, which may be created and stored in a similar manner as the desired list of desired broadcast media contents is created and stored.

The retrieved information is then, in a step 34, compared with the list of desired broadcast media contents, and if the comparison reveals that a broadcast media content that is being, or is in the near future to be, broadcast is comprised in the list of desired broadcast media contents, the user of the device 11, is in a step 35, alerted or notified via the user communication interface 14. After the alerting, or if there is no broadcast media content broadcast that is comprised in the list of desired broadcast media contents, the method may be returned to step 33, preferably after a given period of time has lapsed such as e.g. one or a few seconds in order to relax the demands on the processor 16.

Although, the alerting is preferably performed visually through the display unit 14*b*, other manners of alerting the user may be contemplated, e.g. sound and/or vibration alerts.

The method thus described may be performed in the background while the device 11 is used for other activities than receiving a broadcast media content from a radio station, e.g. when being used for playing back a music track stored in the memory 15. In such instance the method may be initiated when turning on the device itself or firstly when being selected depending on preferred user settings (in order for the method to operate, the radio tuner has to be active, and this will consume additional battery energy). The method may be automatically deactivated or shut down when the device is used for receiving a broadcast media content from a radio station, or it may be run simultaneously, if the device 11 has capabilities for detecting the radio stations to retrieve broadcast media contents information while receiving a broadcast media content from a radio station.

In one embodiment the broadcast media contents are music tracks. In such case the information about each of the music tracks may comprise a title of the music track, a name of an artist or artist group on the music track, and/or a name of a music album, to which the music track belongs.

Similarly, the desired broadcast media contents may be defined as music track titles, as music tracks performed by any of a list of desired artists or artist groups, as music tracks belonging to any of a desired list of music albums and/or as music tracks belonging to any of a desired list of music genres.

If the list is automatically created by the processor 16, the processor may automatically determine the desired broadcast media contents as music tracks performed by artists or artist groups which are comprised among artists or artist groups of music tracks stored in the memory 15, or as music tracks belonging to music albums which are comprised among music albums to which music tracks stored in the memory 15 belong. The stored music tracks may be mp3 tracks, wma tracks, or tracks of other format.

Alternatively, information about music tracks that are received from the radio stations 13*a-d* by the radio tuner 12 is automatically logged, and the desired music tracks are automatically determined as music tracks performed by artists or artist groups, or as music tracks belonging to music albums, which are comprised in the logged information.

If the alerting of the user is made visually through the display unit 14*b*, the alert may comprise the title of the music track, which is comprised in the list of desired music tracks, the name of the artist or artist group on the music track, and/or the name of the music album, to which the music track belongs.

Figure 3B:
FIGS. 3*b*, 4*b*, 5*b*, 6*b*, and 7*b* give each an example of a visual alert or notification as being displayed to a user of the broadcast media contents receiving device of FIG. 1 while a respective one of the methods illustrated in FIGS. 3*a*-8*a* is being performed.

In FIG. 3*b* is illustrated an example of a visual alert or notification called "Radio Alert" comprising the name of the artist or artist group on the music track, in this example "Anastasia", and the name of the radio station broadcasting the music track, in this example, "100 FM". Preferably, the "Radio Alert" is realized as a display or pop-up window in the display unit 14*b*.

Further, the "Radio Alert" is accompanied by a selection key or button "Listen" to allow the user to select to listen to the music track, wherein, if the button is pushed (or selected in other manner) by the user, the radio tuner is activated or, if not already being activated, and is tuned to the radio station broadcasting the music track. Likewise, a selection key or button "Exit" may be provided to allow the user to select not to listen to the music track, i.e. to ignore the alert, wherein, if this button is pushed or selected by the user, the "Radio Alert" is removed. Alternatively, or additionally, the visual alert may be removed automatically when a given period of time, i.e. 1-2 minutes, has lapsed, or when information from the radio station indicates that the music track is no longer broadcast. The visual alert may be accompanied by a short sound or vibration signal.

Note that the user interface may be realized in a number of different manners. The user interface may for instance be a virtual user interface or a voice user interface. If a voice interface is implemented the commands could either be given by key press or by spoken commands, and the alerts may be either spoken (using synthetic speech) or, possibly depending on user setting, a prelude or sample of the found content could be played whereupon the user could be given the possibility to either switch or remain.

In an alternative embodiment, an alert may be accompanied by an automatic activation of the radio tuner 12, if not already being activated, and automatic tuning to the radio station broadcasting the music track, which is comprised in the list of desired music tracks, or in another list of desired music tracks, i.e. a shorter list of the most desired music tracks. This option may particularly be selected when the device 11 is used as a clock radio for wake up or other alarms.

Upon automatic switching to the desired music track, the previously played content, if any, may be buffered or paused so as to make sure that the user would miss anything should be decide to remain playing the previous content.

If the radio tuner 12 is tuned to the radio station broadcasting the music track, which is comprised in the list of desired music tracks, the device may be configured to automatically return to its previous status or setting (which might have been playing back a music track stored in the memory 15), or to simply stay with the radio tuner activated and tuned to the same radio station after having received the desired music track.

In yet an alternative embodiment, the alert could be accompanied with an automatic switch to the desired music track after a given period of time provided that the user has not actively selected to remain without switching. Yet alternatively, the could be accompanied with a possibility for the user to actively, by a simple command within a given period of time, selecting to switch to the desired music track.

All the variations may be specified by the user in the user settings.

The above embodiment makes it possible for the user to always know when tracks of some of his/her favorite artists are broadcast on the radio, and it allows the user to easily select to listen to those tracks.

The embodiment offers an entirely novel method for music listening; no time consuming manual radio station detection is needed. The device will perform the work of finding the user's favorite music. Further, it allows the user to easily swap from mp3 playing to radio listening in a seamless manner.

It shall be appreciated that the broadcast media contents may in other embodiments be other media contents such as TV or other video streaming contents. In such case the information about each of the broadcast media contents may comprise artists, actors, director, screenplay writer, producer, genre, title, episodes or subjects of the broadcast media contents. Subject may be a valuable information if the broadcast media content is e.g. a documentary or an interview.

In yet an embodiment the broadcast media contents may be virtual radio media files. Next, with reference to the flow chart of FIG. 4*a*, a method as performed by the broadcast media contents receiving device of FIG. 1 according to a second embodiment of the invention will be described. This method is referred to as a method for recording favorite music broadcast from a radio station, and is identical with the previous embodiment regarding steps 31-34 and variants thereof.

Instead of alerting the user if the comparison in step 34 reveals that a music track that is being broadcast is comprised in the list of desired music tracks, at least part of the music track that is being, or is in the near future to be, broadcast and comprised in the list of desired music tracks in the memory is, in a step 41, recorded automatically. Prior to start recording, the radio tuner 12 has to be activated, if it is not already activated, and it has to be tuned to the radio station broadcasting the desired music track, if it is not already tuned to that radio station.

Note, however, that it may be checked whether the desired broadcast media content is already stored in the memory 15 of the device 11 and in such instance no recording will take place.

Note also that if a user is currently listening to radio the method may only be implemented if the radio tuner has capabilities of detecting at least the RDS information of the radio stations while still the user can listen to a particular radio station. If the device has two radio tuners, the user may be able to listen to one radio station, while a music track broadcast from another radio station is recorded. If, however, the device only has capabilities of detecting the RDS information of the radio stations while the user listens to a particular radio station, the user may be alerted of that a desired music track is being, or is in the near future to be, broadcast from another radio station, and may be given the choice of whether the current radio station should be kept or whether the radio tuner should be tuned to the other radio station and the desired music track should be recorded.

Figure 4B:
Figure 4A:
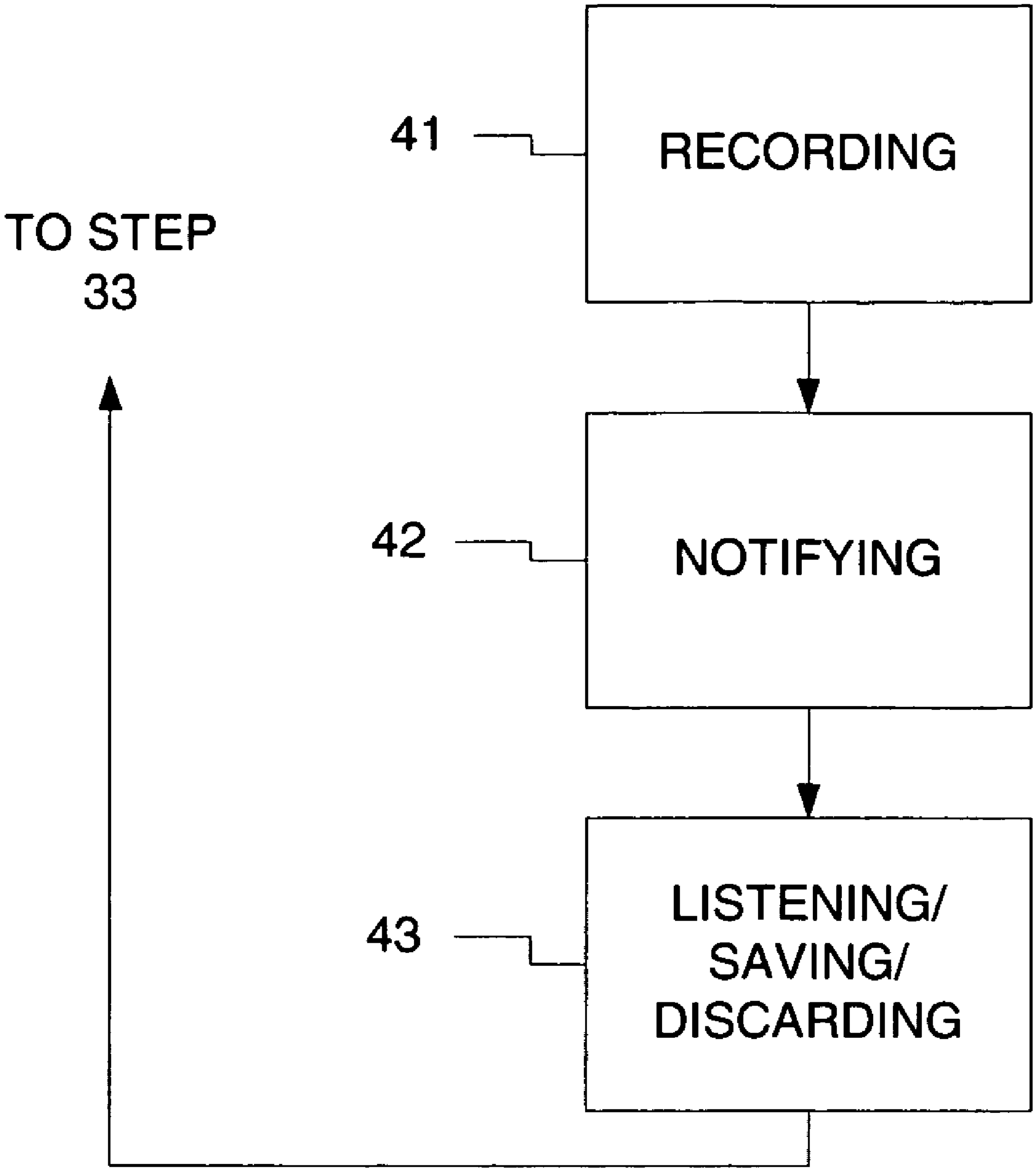

When the recording has been finished, the user is, in a step 42, notified of that fact. The notification may be realized as a display or pop-up window in the display unit 14*b*. FIG. 4*b* illustrates an example of such a notification called "Radio recording" comprising the name of the artist or artist group on the music track, in this example "Anastasia", the title of the music track, in this example "Paid my dues", and the name of the radio station broadcasting the music track, in this example, "100 FM".

Further, the "Radio recording" notification is accompanied by three selection keys or buttons "Listen", "Save", and "Discard". The selection keys or buttons allow the user, in a step 43, to select to listen to the recorded music track, to save the recorded track in the memory, or to discard the recording. The notification may also be accompanied by a short sound or vibration signal. In case the music track is saved the user may be given a possibility to add the saved music track to a selected play list or to a default play list.

If the user makes no choice, the notification may be removed automatically when a given period of time, i.e. 1-2 minutes, has lapsed. Depending on the user settings the recorded music track may be played back, recorded, or discarded either instead of providing the notification or after the notification has been removed and no choice has been made.

The above embodiment provides for automatic detection and recording of tracks of the user's favorite artists when being broadcast on the radio. In many applications the embodiment provides for the recording of entire music tracks. Further, it provides a tool for users to load music into their devices.

Figure 5A:
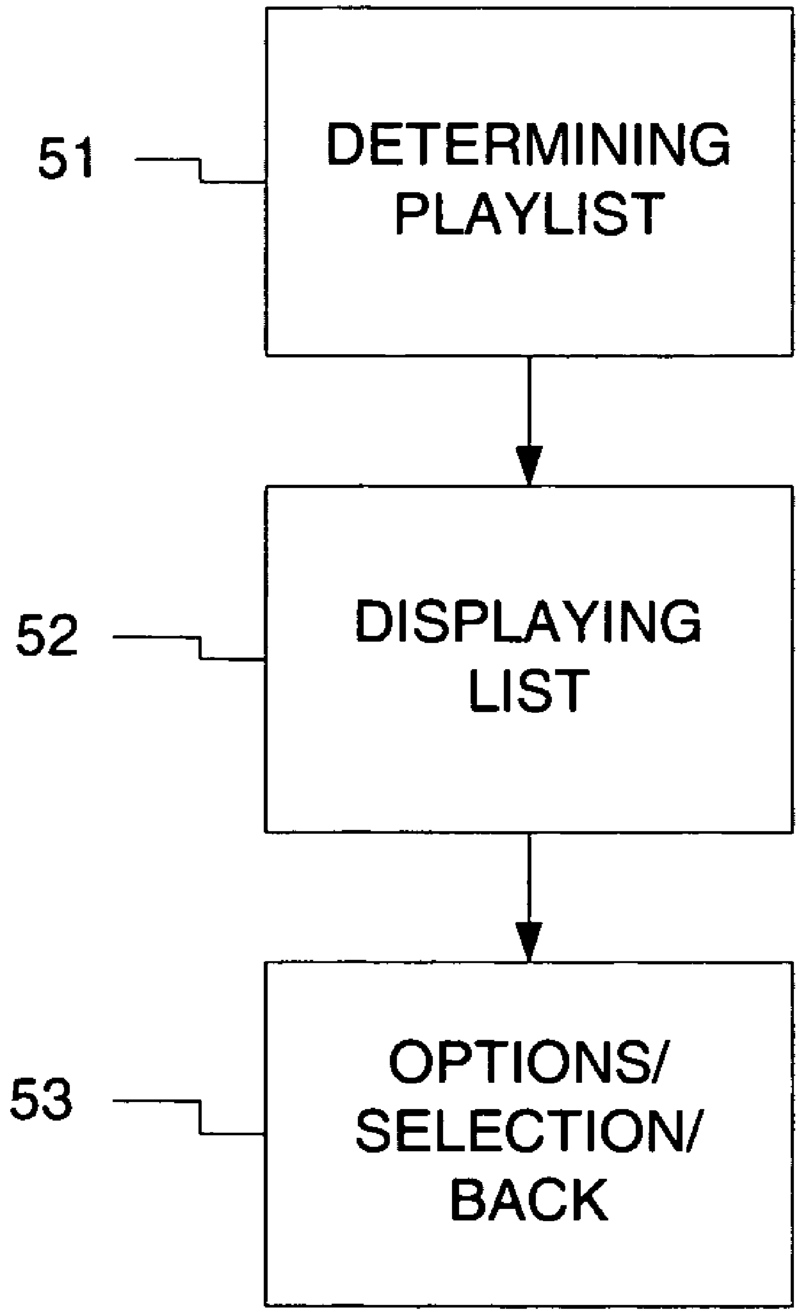

Next, with reference to the flow chart of FIG. 5*a*, a method as performed by the broadcast media contents receiving device of FIG. 1 according to a third embodiment of the invention will be described. This method is referred to as a method for intelligent radio station selection, and is identical with the previous embodiment regarding steps 31-33 and variants thereof.

Subsequent to step 33, radio stations of a list of radio stations are, in a step 51, automatically determined based on the list of desired broadcast media contents stored in the memory 15 of the device 11 and on the information of the broadcast media contents that are, or are in the near future to be, broadcast from the radio stations retrieved in step 33.

Figure 5B:
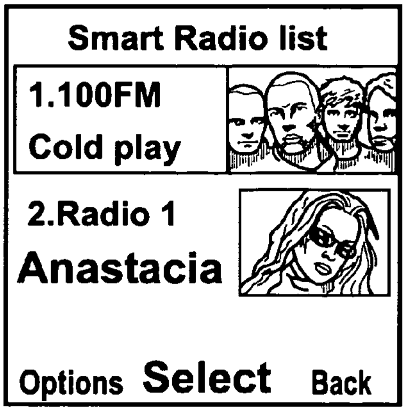

Then, the determined list of radio stations is, in a step 52, displayed provided that the list contains more than one radio station. The list may be displayed in a pop-up window in the display unit 14*b*. FIG. 5*b* illustrates an example of such a list called "Smart Radio List" in case the desired broadcast media contents are desired music tracks. The list comprises for each entry the list number, the name of the radio station, and the name of the artist or artist group on the music track. In this example the radio station "100 FM" and the artist group name "Cold Play" are given in the first entry, and the radio station "Radio 1" and the artist name "Anastasia" are given in the second entry.

Further, the "Smart Radio List" comprises three selection keys or buttons "Options", "Select", and "Back". The selection keys or buttons allow the user, in a step 53, to select different options, to listen to any radio station in the list (the list may be scrolled by arrow buttons of the keypad 14*a* or by a joystick to find a preferred radio station), or to back to a previous application (whereupon the pop-up window is removed). The displaying of the "Smart Radio List" may also be accompanied by a short sound or vibration signal.

If the user makes no choice, the list of radio stations may be removed automatically when a given period of time has lapsed. Depending on the user settings a radio station in the list of radio stations may be selected for listening either instead of displaying the list of radio stations or after the list has been removed and no choice has been made.

Particularly, if the list contains only one radio station, this radio station may be selected for listening instead of displaying the list of the single radio station.

If the desired broadcast media contents are desired music tracks they may be automatically determined as music tracks performed by artists or artist groups which are comprised among artists or artist groups of music tracks stored in the memory, or as music tracks belonging to music albums which are comprised among music albums to which music tracks stored in the memory belong. Alternatively, they are determined in any other manner as described in this description.

In one version of this embodiment, the radio stations are arranged in a prioritized order in the list of radio stations. The prioritizing may be made manually by the user, or may The method may be performed in dependence on activation, preferably manually initiated by the user, of the radio tuner. Alternatively, the steps are performed when the radio tuner is tuned, preferably manually, from one station to another.

The above embodiment provides for a much easier manner to choose a radio station broadcasting music tracks of interest to the user. A list of radio stations is automatically displayed in accordance with the user's own music and artist preferences. Additionally, the embodiment may allow the user to always start up the radio on a station playing the user's favorite music if such a station is available at a given instant.

Figure 6B:
Figure 6A:
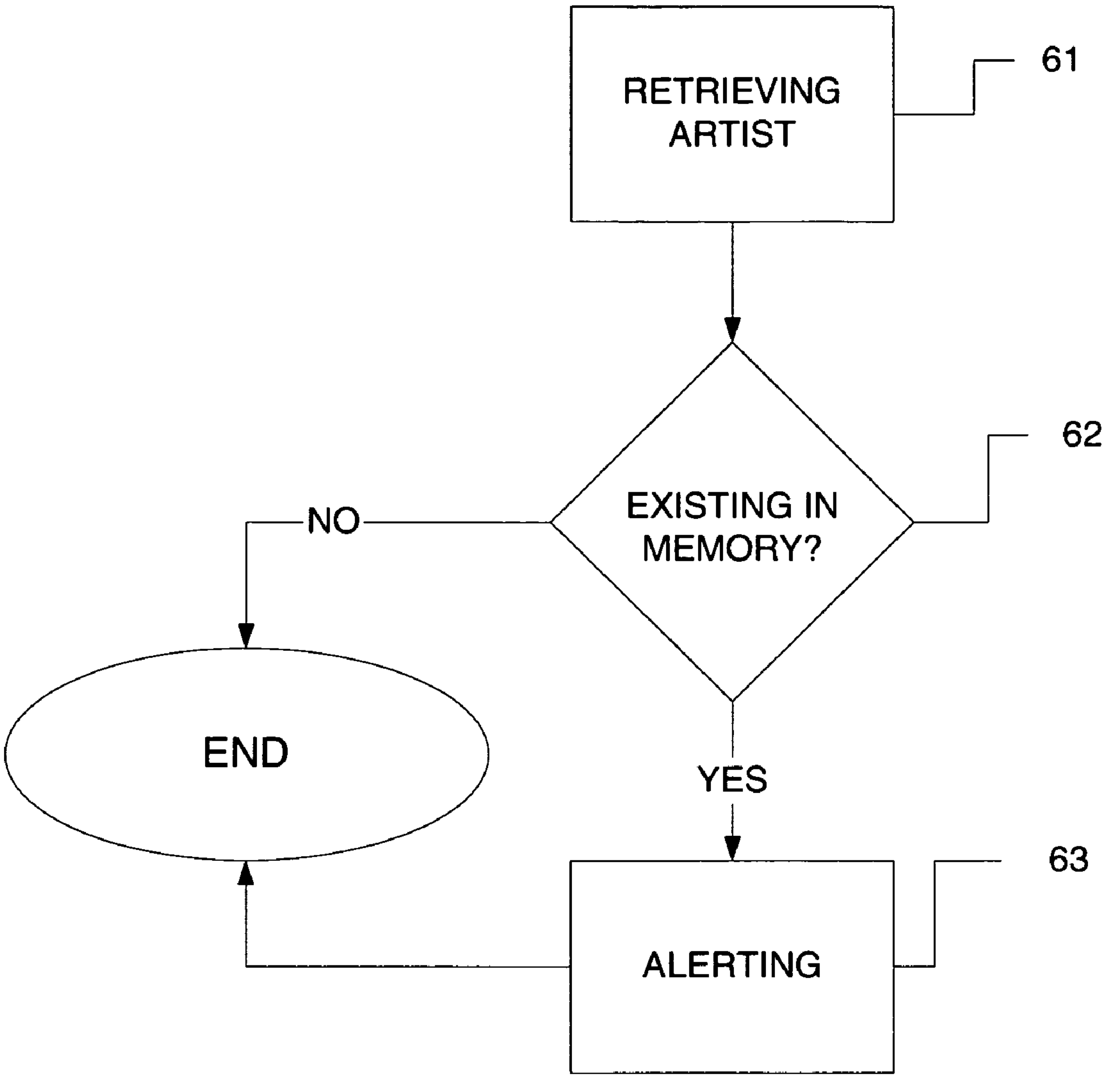

Next, with reference to the flow chart of FIG. 6*a*, a method as performed by the broadcast media contents receiving device of FIG. 1 according to a fourth embodiment of the invention will be described. This method is referred to as a method for finding and accessing related music on a music player when listening to music on the radio.

A prerequisite for performing the method is that a music track is currently being received by the radio tuner 12. According to the method the name of the artist or artist group on the music track received by the radio tuner is, in a step 61, retrieved. The name of the artist or artist group is, in a step 62, compared with names of artists or artist groups of music tracks stored in the memory 15 of the device 11. Finally, the user is, in a step 63, alerted via the user communication interface if the comparison reveals that the name of the artist or artist group on the music track received by the radio tuner is comprised among the names of the artists or artist groups of music tracks stored in the memory. The alert may realized as a display or pop-up window in the display unit 14*b*. FIG. 6*b* illustrates an example of such an alert in a device comprising a music player. The alert comprises the name of the artist or artist group on the music track received by the radio tuner, in this example "Cold Play", and a notification that the artist or artist group, which is played on the radio, is comprised among the artists of music tracks stored in the memory, in this example called "MP3 directory".

Further, the alert is accompanied by two selection keys or buttons "Play" and "Ignore". The selection keys or buttons allow the user to select to play back the music track(s) that are stored in the memory and performed by the artist or artist group on the music track received by the radio tuner, or to simply ignore the alert, whereupon the alert is removed. The alert may also be accompanied by a short sound or vibration signal. If there are several music tracks stored in the memory and performed by the artist or artist group on the music track received by the radio tuner, the music tracks may be played back in a given order or in a random order, or a further pop-up window with a list of these music tracks may be displayed to allow the user to play back a selected one of the music tracks.

If the user makes no choice, the alert may be removed automatically when a given period of time has lapsed. Depending on the user settings the music track(s) that are stored in the memory and performed by the artist or artist group on the music track received by the radio tuner may be played back either instead of providing the alert, or after the alert has been removed and no choice has been made.

Next, with reference to the flow chart of FIG. 7*a*, a method as performed by the broadcast media contents receiving device of FIG. 1 according to a fifth embodiment of the invention will be described. This method is referred to as a method for finding and accessing related music on radio when playing back music on a music player.

Prerequisites for performing the method are that the device comprises music player capable of playing back music tracks stored in the memory of the device, and that a music track performed by a known artist or artist group is currently being played back on the music player. According to the method the radio tuner is, in a step 71, controlled to detect the radio stations to retrieve artist name information of music tracks that are, or are in the near future to be, broadcast from the radio stations. The name of the artist or artist group on the music track currently being played back on the music player is then, in a step 72, compared with artist name information of music tracks that are, or are in the near future to be, broadcast from the radio stations. The user is, in a step 73, alerted via the user communication interface if the comparison reveals that the name of the artist or artist group on the music track played back on the music player is comprised in the artist name information of music tracks that are, or are in the near future to be, broadcast from the radio stations. The alert may realized as a display or pop-up window in the display unit 14*b*. FIG. 6*b* illustrates in the middle an example of such an alert. The alert includes a message that a music track performed by the artist or artist group is now broadcast on the radio, and is accompanied by the name of the artist or artist group, in this example "Anastacia", the title of the music track that is being broadcast on the radio, in this example "Boom", and the name of the radio station broadcasting the music track, in this example "100 FM".

Further, the alert is accompanied by two selection keys or buttons "Play" and "Ignore". The selection keys or buttons allow the user to select to listen to the music track that are, or are in the near future to be, broadcast from the radio station and performed by the artist or artist group on the music track played back on the music player, or to simply ignore the alert, whereupon the alert is removed. The alert may also be accompanied by a short sound or vibration signal. If there are several music tracks performed by the artist or artist group on the music track played back on the music player that are, or are in the near future to be, broadcast on the radio simultaneously, one of these tracks is automatically selected e.g. randomly or based on a priority list, or a further pop-up window with a list of these music tracks may be displayed to allow the user to tune to a selected one of the radio stations and listen a selected one of the music tracks.

FIG. 6*b* illustrates on the left-hand side an example of a display window during play back of the music track on the music player prior to the alerting, and on the right-hand side an example of a display window during listening to the music track from the radio station.

If the user makes no choice, the alert may be removed automatically when a given period of time has lapsed, where the display window on the left-hand side of FIG. 6*b* is displayed. Depending on the user settings the device may activate the radio tuner automatically, if not already being activated, and tune to the radio station broadcasting the music track performed by the artist or artist group on the music track played back on the music player, if not already being tuned to such station, either instead of providing the alert, or after the alert has been removed and no choice has been made.

The embodiments described with reference to FIGS. 6 and 7 provide for a seamless utilization of the media players, e.g. the radio and the music player, of the device since the user is capable of be guided in an intelligent manner to listen to e.g. related music tracks stored in the memory when listening to a particular track or track of a particular artist on the radio, and vice versa. The embodiments provide for added value in his/her music playing capabilities. Further, thanks to the swapping functionality of the embodiments the user may get inspired to listen of music tracks stored in the memory when listening to a related track on the radio, and vice versa.

Figure 8A:
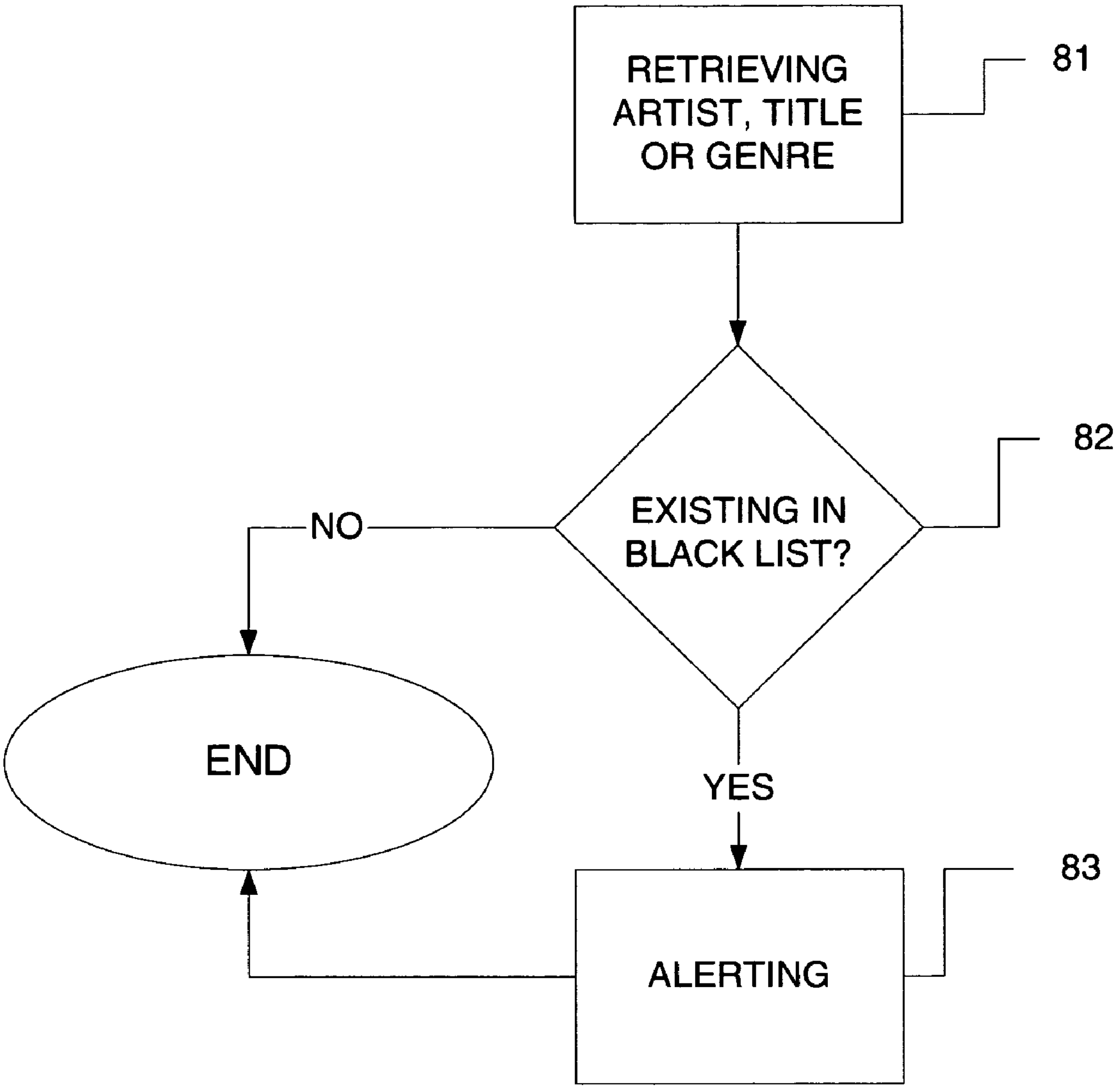

Next, with reference to the flow chart of FIG. 8*a*, a method as performed by the broadcast media contents receiving device of FIG. 1 according to a sixth embodiment of the invention will be described. This method is referred to as a method for finding and accessing related music on radio when playing back music on a music player.

A prerequisite for performing the method is that a music track is currently being received by the radio tuner 12. According to the method the name of the artist or artist group on the music track, the title of the music track, or the genre to which the music track belongs is, in a step 81, retrieved.

In a step 82, the name of the artist or artist group is compared with a blacklist of artists or artist groups stored in the memory, the title of the music track is compared with a blacklist of music track titles stored in the memory, or the genre to which the music track belongs is compared with a blacklist of genres stored in the memory. Finally, in a step 83, the user is alerted via the communication interface or the radio tuner 12 is automatically tuned to another radio station if the comparison reveals that the name of the artist or artist group on the music track is comprised in the blacklist of artists or artist groups, that the title of the music track is comprised in the blacklist of music track titles, or that the genre to which the music track belongs is comprised in the blacklist of genres.

If an alert is displayed it may be realized as a display or pop-up window in the display unit 14*b*. An example of such an alert in a device comprising an mp3 music player may comprise a message that a music track now broadcast on the radio is on a blacklist, in this example as being performed by a blacklisted artist or artist group, e.g. “Ricky Martin”.

Further, the alert is accompanied by three selection keys or buttons “Radio”, “MP3” and “Ignore”. The selection keys or buttons allow the user to select to tune the radio tuner to another radio station, to switch off the radio and activate the mp3 music player, and optionally to play back a music track stored in the memory, or to simply ignore the alert, whereupon the alert is removed. The alert may also be accompanied by a short sound or vibration signal.

Figure 7B:
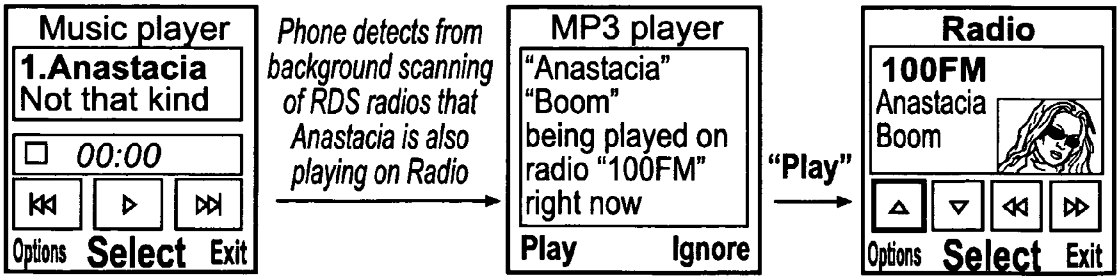
Figure 7A:
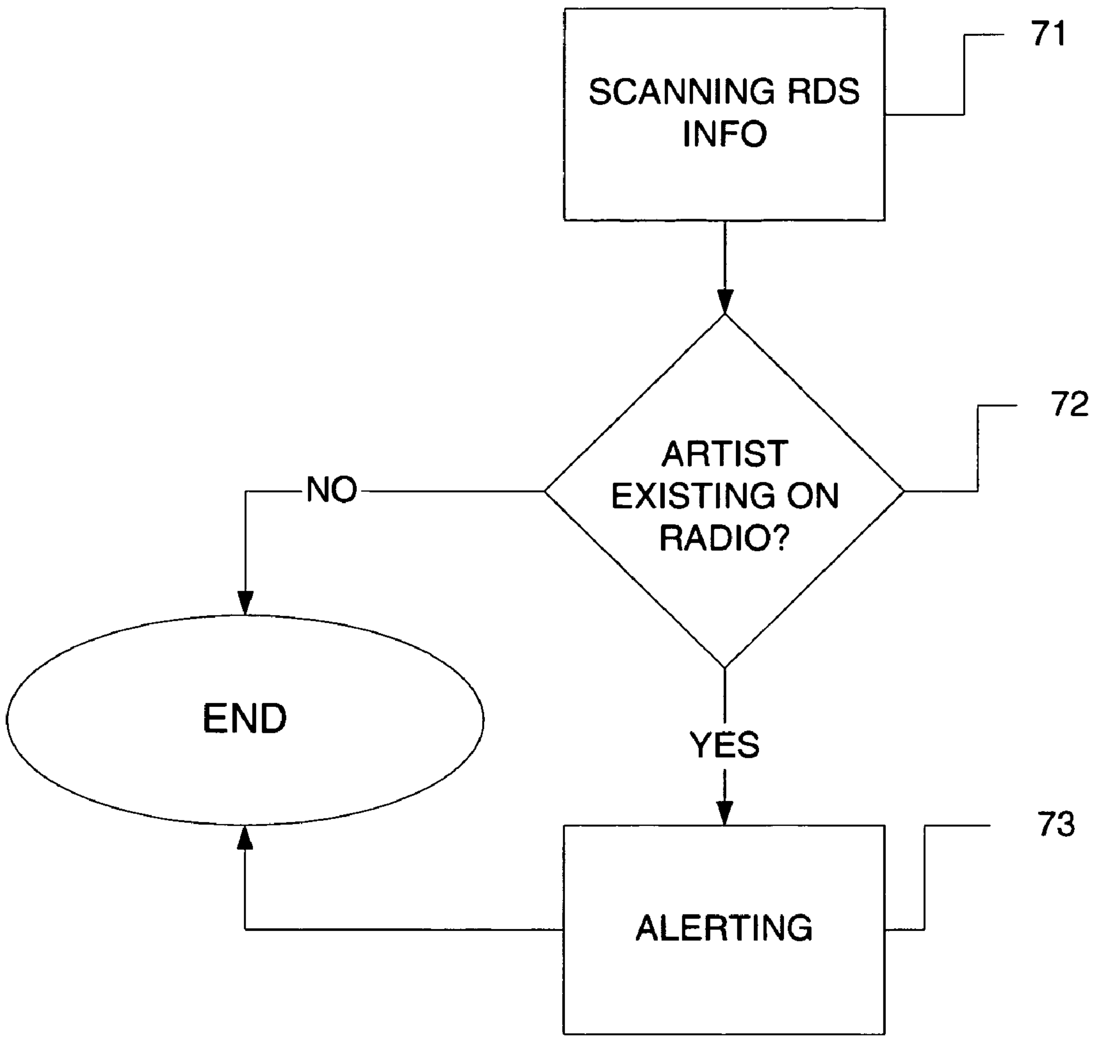

An example of a display window during listening to the music track from the radio station prior to the alerting may be similar to that shown to the right-hand side in FIG. 7*b*.

If the user makes no choice, the alert may be removed automatically when a given period of time has lapsed, wherein e.g. the display window on the right hand side of FIG. 7*b* is displayed again. Depending on the user settings the device may instead automatically switch to a music player playing back music tracks stored in the memory (provided that the device includes a music player), or the radio is simple switched off either instead of providing the alert or tuning the radio, or after the alert has been removed and no choice has been made.

If a music track is received by the radio tuner 12, where the name of the artist or artist group on the music track is not comprised in the blacklist of artists or artist groups, the title of the music track is not comprised in the blacklist of music track titles, and/or the genre to which the music track belongs is not comprised in the blacklist of genres, the user may be given the option to select to add the name of the artist or artist group on the music track to the blacklist of artists or artist groups, to add the title of the music track to the blacklist of music track titles, and/or to add the genre to which the music track belongs to the blacklist of genres.

An example of adding an item to the blacklist is as follows. A first display window, similar to the window shown on the right hand side of FIG. 7*b*, may be an ordinary display window that is shown while listening to a radio station. The name of the radio station, in this example may be “100 FM”, the name of the artist or artist group on a music track, in this example may be “Ricky Martin”, and the title of the music track that is received, in this example may be “She bangs”. A selection key or button “Options” exists to allow the user to switch to a second display window. The second display window shows a menu with several options to be made, one of which being called “Blacklist”. By selecting the “Blacklist” a third display window is shown, the window comprising a further menu with several options to be made, one of which being called “Blacklist artist”, another being called “Blacklist track”, and yet another being called “Blacklist genre”. These options allow the user to add the name of the artist “Ricky Martin” to the blacklist of artists or artist groups, to add the track “She bangs” to the blacklist of music tracks, or to add the genre of the music track to the blacklist of music genres. In the example, the option “Blacklist artist”, and as a result the name of the artist “Ricky martin” is added to the blacklist of artists or artist groups. A fourth display window notifies of the result of the selection made.

If the device comprises a music player for playing music tracks stored in the memory, and if a music track is played back on the music player the above concept may be adopted also for such music tracks. If it is established that the name of the artist or artist group on the music track played back on the music player is comprised in the blacklist of artists or artist groups, that the title of the music track is comprised in the blacklist of music track titles, or that the genre to which the music track belongs is comprised in the blacklist of genres, the playing back of the music track is terminated, possibly after an active selection by the user subsequent to an alert being made. Depending on user settings, another music track may be played back on the music player, or another application may be run, e.g. the radio tuner may be activated (switched on) and tuned to a radio station, either automatically or after an active selection by the user subsequent to an alert being made.

The embodiment above provides a simple yet efficient manner for the user to avoid music, which the user does not like.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. An electronic device comprising: a radio tuner capable of receiving broadcast media contents and information about each of the broadcast media contents from a plurality of radio stations; a user communication interface; memory; and a processor configured to access a list of desired broadcast media contents stored in said memory; control said radio tuner to detect said radio stations to retrieve information of the broadcast media contents that are, or are in the near future to be, broadcast from said radio stations; compare said retrieved information with the list of desired broadcast media contents; and alert the user via said user communication interface if said comparison reveals that a broadcast media content that is being, or is in the near future to be, broadcast is comprised in the list of desired broadcast media contents, wherein said broadcast media contents are desired music tracks, wherein said user communication interface comprises a display unit, and said processor is provided for alerting the user visually through said display unit, wherein the visual alert is accompanied by input means for the user to select to listen to the music track, which is comprised in the list of desired music tracks; and the processor is provided for activating the radio tuner, if not already being activated, and for controlling the radio tuner to tune to the radio station broadcasting the music track, which is comprised in the list of desired music tracks, in response to an activation of said input means.

2. The device of claim 1 wherein said device is a hand-portable telephone.

3. The device of claim 1 wherein said radio tuner is an RDS or RBDS radio tuner.

4. The device of claim 1 wherein said broadcast media contents are desired music tracks.

5. The device of claim 4 wherein said information about each of the music tracks comprises a title of the music track, a name of an artist or artist group on the music track, and/or a name of a music album, to which the music track belongs.

6. The device of claim 4 wherein said desired music tracks are defined as desired music track titles, as music tracks performed by any of a set of desired artists or artist groups, and/or as music tracks belonging to any of a set of desired music albums.

7. The device of claim 4 wherein said user communication interface comprises a display unit, and said processor is provided for alerting the user visually through said display unit.

8. The device of claim 7 wherein the visual alert comprises the title of the music track, which is comprised in the list of desired music tracks, the name of the artist or artist group on the music track, and/or the name of the music album, to which the music track belongs.

9. The device of claim 7 wherein the visual alert is accompanied by input means for the user to remove the visual alert and to select to not listen to the music track, which is comprised in the list of desired music tracks.

10. The device of claim 7 wherein said device is provided for removing the visual alert automatically.

11. The device of claim 7 wherein said processor is provided for activating the radio tuner, if not already being activated, and for controlling the radio tuner to tune to the radio station broadcasting the music track, which is comprised in the list of desired music tracks, automatically.

12. The device of claim 1 wherein said radio stations are all radio stations that are being capable of being received by said radio tuner.

13. The device of claim 1 wherein said user communication interface is configured to receive from a user a list of desired radio stations; and said radio stations, which said radio tuner is controlled to detect, are those of said list of desired radio stations.

14. The device of claim 1 wherein said processor is configured to access, control, compare, and alerting while the device is used for receiving a broadcast media content from a radio station.

15. The device of claim 1 wherein said processor is configured to access, control, compare, and alert while the device is used for other activities than receiving a broadcast media content received from a radio station.

16. The device of claim 1 wherein said user communication interface is configured to receive from the user the list of desired broadcast media contents.

17. The device of claim 1 wherein said processor is configured to automatically determining the list of desired broadcast media contents from data stored in said memory.

18. The device of claim 17 wherein said desired broadcast media contents are desired music tracks; and said processor is configured to automatically log information about music tracks that are received from the radio stations by said radio tuner; and automatically determine said desired music tracks as music tracks performed by artists or artist groups, or as music tracks belonging to music albums, which are comprised in the logged information.

19. The device of claim 1 wherein said processor is configured to activate the radio tuner, if not already being activated; control the radio tuner to tune to the radio station broadcasting the broadcast media content that is comprised in the list of desired music tracks; and recording automatically at least part of the broadcast media content that is comprised in the list of desired music tracks in said memory.

20. The device of claim 1 wherein said processor is configured to display a list of radio stations when the radio tuner is activated, the radio stations of the list being automatically determined based on said list of desired broadcast media contents stored in said memory and on said information of the broadcast media contents that are, or are in the near future to be, broadcast from the radio stations.

21. An electronic device comprising: a radio tuner capable of receiving broadcast media contents and information about each of the broadcast media contents from a plurality of radio stations; a user communication interface; memory; and a processor configured to access a list of desired broadcast media contents stored in said memory; control said radio tuner to detect said radio stations to retrieve information of the broadcast media contents that are, or are in the near future to be, broadcast from said radio stations; compare said retrieved information with the list of desired broadcast media contents; and alert the user via said user communication interface if said comparison reveals that a broadcast media content that is being, or is in the near future to be, broadcast is comprised in the list of desired broadcast media contents, wherein said processor is configured to automatically determining the list of desired broadcast media contents from data stored in said memory, wherein said desired broadcast media contents are desired music tracks; and said processor is configured to automatically determine the desired broadcast media contents as music tracks performed by artists or artist groups which are comprised among names of artists or artist groups of music tracks stored in said memory, or as music tracks belonging to music albums which are comprised among music albums to which music tracks stored in said memory belong.

22. An electronic device comprising: a radio tuner capable of receiving broadcast media contents and information about each of the broadcast media contents from a plurality of radio stations; a user communication interface; memory; and a processor configured to access a list of desired broadcast media contents stored in said memory; control said radio tuner to detect said radio stations to retrieve information of the broadcast media contents that are, or are in the near future to be, broadcast from said radio stations; compare said retrieved information with the list of desired broadcast media contents; and alert the user via said user communication interface if said comparison reveals that a broadcast media content that is being, or is in the near future to be, broadcast is comprised in the list of desired broadcast media contents, wherein, if a music track is received by said radio tuner, said processor is configured to retrieve the name of the artist or artist group on the music track received by the radio tuner; compare the name of the artist or artist group with names of artists or artist groups of music tracks stored in said memory; and alert the user via said user communication interface if said comparison reveals that the name of the artist or artist group on the music track received by the radio tuner is comprised among the names of the artists or artist groups of music tracks stored in said memory.

23. An electronic device comprising: a radio tuner capable of receiving broadcast media contents and information about each of the broadcast media contents from a plurality of radio stations; a user communication interface; memory; and a processor configured to access a list of desired broadcast media contents stored in said memory; control said radio tuner to detect said radio stations to retrieve information of the broadcast media contents that are, or are in the near future to be, broadcast from said radio stations; compare said retrieved information with the list of desired broadcast media contents; and alert the user via said user communication interface if said comparison reveals that a broadcast media content that is being, or is in the near future to be, broadcast is comprised in the list of desired broadcast media contents, further comprising a music player for playing music tracks stored in said memory, wherein, if a music track is played back on said music player, said processor is provided for retrieving the name of the artist or artist group on the music track that is played back; controlling said radio tuner to detect said radio stations to retrieve artist name information of music tracks that are, or are in the near future to be, broadcast from said radio stations; comparing the name of the artist or artist group on the music track that is played back with the artist name information of music tracks that are, or are in the near future to be, broadcast from said radio stations; and alerting the user via said user communication interface if said comparison reveals that the name of the artist or artist group on the music track that is played back is comprised in the artist name information of music tracks that are, or are in the near future to be, broadcast from said radio stations.

24. An electronic device comprising: a radio tuner capable of receiving broadcast media contents and information about each of the broadcast media contents from a plurality of radio stations; a user communication interface; memory; and a processor configured to access a list of desired broadcast media contents stored in said memory; control said radio tuner to detect said radio stations to retrieve information of the broadcast media contents that are, or are in the near future to be, broadcast from said radio stations; compare said retrieved information with the list of desired broadcast media contents; and alert the user via said user communication interface if said comparison reveals that a broadcast media content that is being, or is in the near future to be, broadcast is comprised in the list of desired broadcast media contents, wherein, if a music track is received by said radio tuner, said processor is provided for retrieving the name of the artist or artist group on the music track or the title of the music track; comparing the name of the artist or artist group with a blacklist of artists or artist groups stored in said memory, or the title of the music track with a blacklist of music track titles stored in said memory; and alerting the user via said user communication interface or automatically tuning said radio tuner to another radio station if said comparison reveals that the name of the artist or artist group on the music track is comprised in said blacklist of artists or artist groups, or that the title of the music track is comprised in said blacklist of music track titles.

* * * * *